United States Patent
Lee et al.

(10) Patent No.: US 7,554,619 B2
(45) Date of Patent: Jun. 30, 2009

(54) STACKED STORAGE CAPACITOR STRUCTURE FOR A LTPS TFT-LCD

(75) Inventors: Mu-Chia Lee, Taipei (TW); Chun-Wei Huang, Jhonghe (TW); Hung-Che Lu, Hsinchu (TW); Kuo-Hung Kuo, Kaohsiung (TW); Hong-Bin Li, Hukou Township (TW); Wen-Kuei Lai, Tianjhong Township (TW); Chia-Yi Tsai, Luodong Township (TW); Yu-Chi Chang, Hukou Township (TW); Hau-Chiun Li, Taitung (TW); Wei-Chih Chang, Jhunan Township (TW)

(73) Assignee: TPO Displays Corp., Chu-Nan (TW)

( * ) Notice: Subject to any disclaimer, the term of this patent is extended or adjusted under 35 U.S.C. 154(b) by 419 days.

(21) Appl. No.: 11/295,422

(22) Filed: Dec. 5, 2005

(65) Prior Publication Data

US 2007/0126943 A1     Jun. 7, 2007

(51) Int. Cl.
*G02F 1/1343* (2006.01)
(52) U.S. Cl. .......................... 349/39; 349/38
(58) Field of Classification Search .................. 349/39, 349/38
See application file for complete search history.

(56) References Cited

U.S. PATENT DOCUMENTS

| | | | | |
|---|---|---|---|---|
| 5,576,858 A | * | 11/1996 | Ukai et al. | 349/42 |
| 5,831,692 A | | 11/1998 | Lee | |
| 6,762,803 B1 | * | 7/2004 | Koide | 349/43 |
| 7,435,992 B2 | * | 10/2008 | Choi et al. | 257/72 |
| 2003/0107687 A1 | * | 6/2003 | Choo et al. | 349/39 |
| 2005/0173703 A1 | * | 8/2005 | Lebrun | 257/59 |

FOREIGN PATENT DOCUMENTS

| | | |
|---|---|---|
| CN | 1570741 | 1/2005 |
| CN | 1680861 | 10/2005 |
| CN | 1702530 | 11/2005 |
| EP | 0066852 | 12/1982 |
| EP | 0464579 | 1/1992 |
| TW | 513589 | 12/2002 |
| TW | 249173 | 2/2006 |

* cited by examiner

*Primary Examiner*—David Nelms
*Assistant Examiner*—Thanh-Nhan P Nguyen
(74) *Attorney, Agent, or Firm*—Liu & Liu (57) ABSTRACT

The invention discloses a stacked storage capacitor structure for a LTPS TFT-LCD comprising a processed substrate, a first storage capacitor and a second storage capacitor. The first storage capacitor comprises a first conductive layer, a second conductive layer and a first insulating layer therebetween. The stacked storage capacitor structure further comprises a third conductive layer including a first portion and an extended second portion. The second storage capacitor comprises the second conductive layer, the extended second portion of the third conductive layer and a second insulating layer therebetween.

20 Claims, 11 Drawing Sheets

STACKED STORAGE CAPACITOR STRUCTURE FOR A LTPS TFT-LCD

BACKGROUND

The invention relates to a low temperature polysilicon (LTPS) TFT-LCD, and more particularly to a stacked storage capacitor structure and methods for fabricating the same.

Figure 1A:
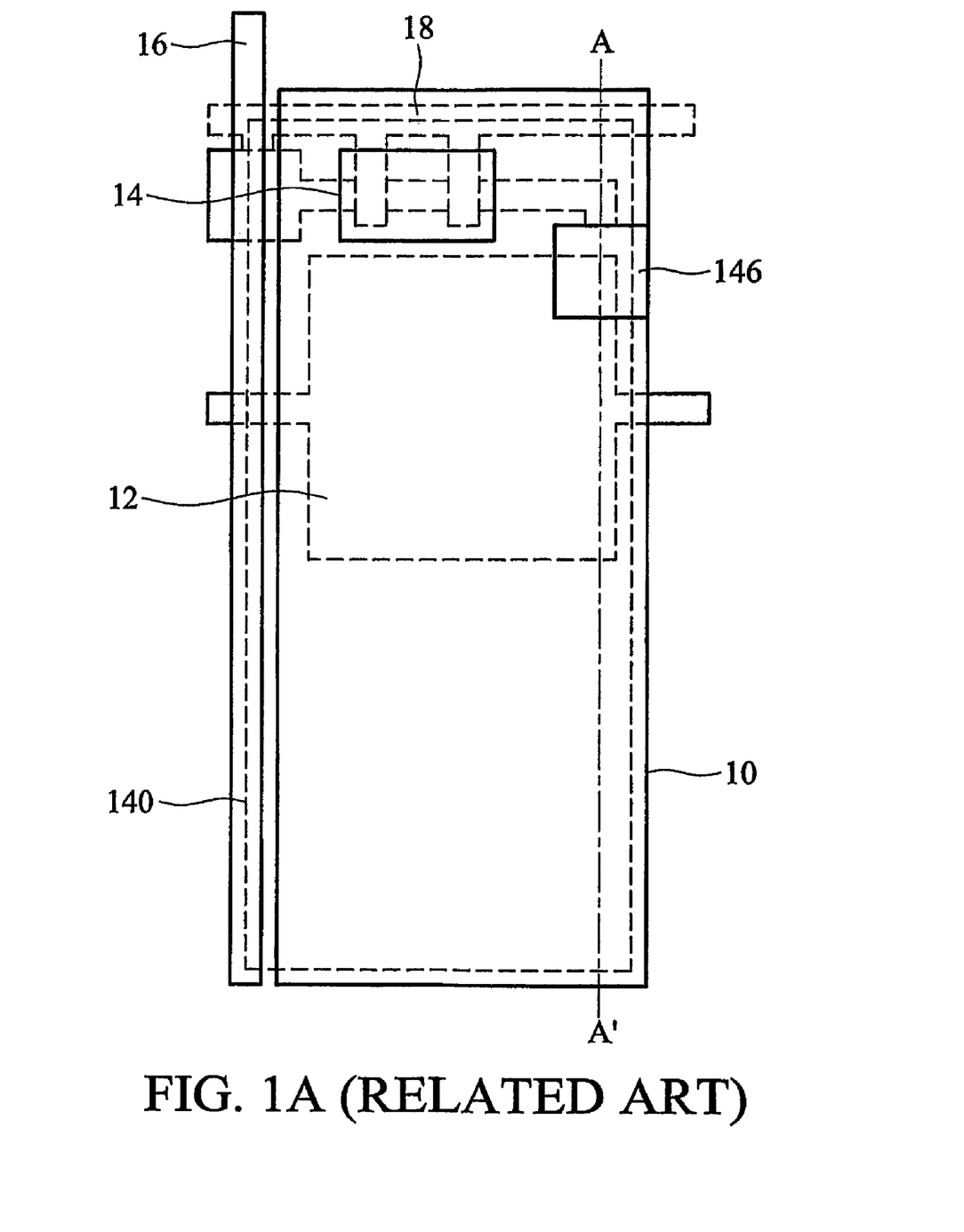
FIG. 1A is a plan view of a pixel where a storage capacitor for a conventional LTPS TFT-LCD is formed.
Figure 1B:
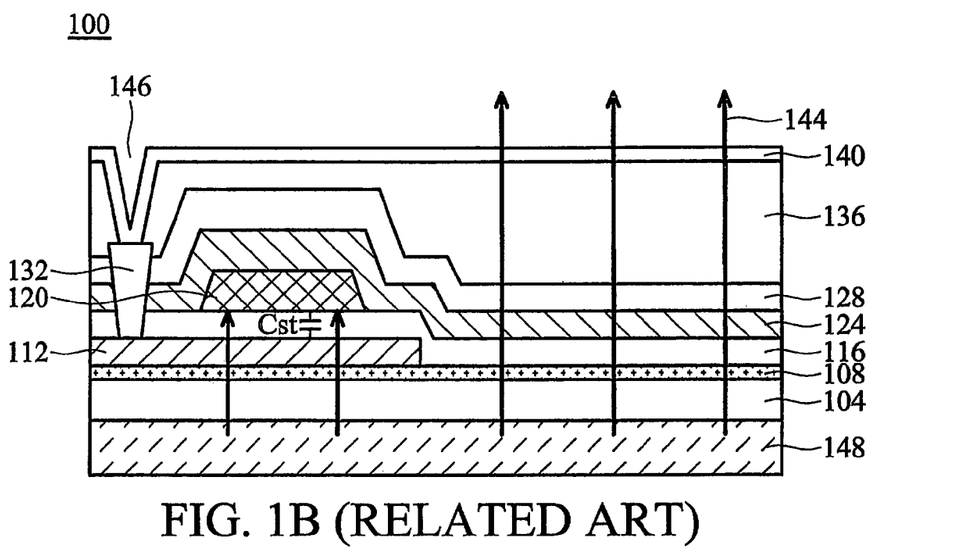
FIG. 1B is a sectional view taken along line A-A' of the pixel shown in FIG. 1A.
Figure 1C:
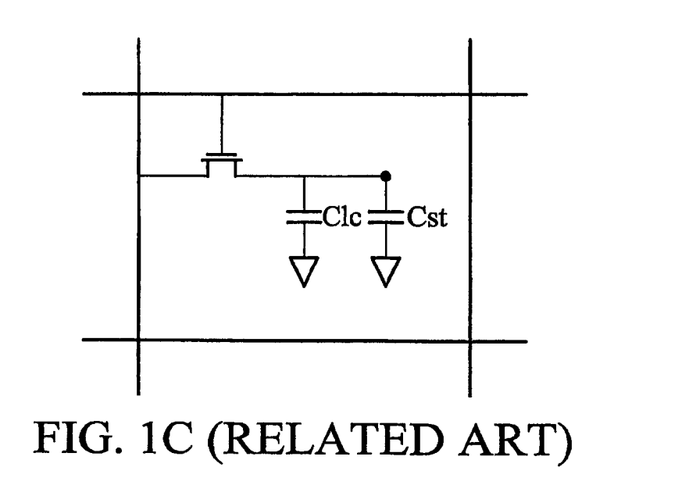
FIG. 1C is an equivalent circuit of the pixel shown in FIG. 1A.

FIG. 1A is a plan view of a pixel in which a storage capacitor for a conventional LTPS TFT-LCD is formed. FIG. 1B is a sectional view taken along line A-A' of the pixel shown in FIG. 1A. FIG. 1C is an equivalent circuit of the pixel shown in FIG. 1A.

In FIG. 1A, a pixel 10 with a storage capacitor 12, a TFT 14 and a pixel electrode 140 disposed thereon is provided. A signal line 16 and a gate line 18 cross in the vicinity of the TFT 14, and are disposed around the pixel 10. The pixel electrode 140 and the storage capacitor 12 are electrically connected to the TFT 14 by means of via 146.

In FIG. 1B, a processed substrate 104 comprising a buffer layer 108, a p-Si layer 112 as a first conductive layer, a gate insulating layer 116, a second conductive layer 120, a first interlayer dielectric 124, and a second interlayer dielectric 128 is provided. The p-Si layer 112, the second conductive layer 120 and the gate insulating layer 116 therebetween consist of the storage capacitor (Cst)12. By means of well known processes, a metal layer 132 is formed. Thereafter, a passivation layer 136 with via 146 therein is formed over the metal layer 132 and the second interlayer dielectric 128. A transparent pixel electrode 140 is conformally formed over the passivation layer 136 and the via 146. The pixel electrode 140 may comprise ITO or IZO. Additionally, a backlight module 148 is disposed on the other side of the substrate 104, thus, a TFT array substrate 100 for a LTPS TFT-LCD is obtained. The arrow 144 represents light from the backlight module 148.

In FIG. 1C, an equivalent circuit of the pixel shown in FIG. 1A is provided.

To meet the increased requirements the higher display resolution, pixel size must be decreased, thus, the area of the storage capacitor used in LTPS TFT-LCDs must be minimized concurrently. As the display resolution increases, however, the area available on each pixel for the storage capacitor must be reduced to maintain aperture ratio. At the same time, problems such as flickering, image retention and cross-talk are likely to occur.

Accordingly, a new structure capable of increasing storage capacitance without sacrificing the aperture ratio of a pixel, or maintaining the storage capacitance while increasing the aperture ratio of a pixel in an LTPS TFT-LCD is desirable.

SUMMARY

The invention discloses a stacked storage capacitor structure for LTPS TFT-LCDs. A first embodiment of the invention comprises a processed substrate, a first storage capacitor and a second storage capacitor. The first storage capacitor comprises a first conductive layer, a second conductive layer and a first insulating layer therebetween, wherein the second conductive layer is disposed over the first conductive layer, and the first storage capacitor is disposed over the processed substrate. The stacked storage capacitor structure further comprises a third conductive layer including a first portion and an extended second portion. The second storage capacitor comprises the second conductive layer, the extended second portion of the third conductive layer and a second insulating layer therebetween, wherein the extended second portion of the third conductive layer is disposed over the second conductive layer, and wherein the second storage capacitor is on the first storage capacitor, and is electrically connected thereto.

The first embodiment further comprises a passivation layer with via therein and a pixel electrode overlying the passivation layer, wherein the pixel electrode is electrically connected to the first portion of the third conductive layer through the via. In addition, the embodiment further comprises a third insulating layer between the second insulating layer and the extended second portion of the third conductive layer, wherein the third insulating layer and the second insulating layer has a recessed portion.

Preferably, in a second embodiment further comprises a third insulating layer is disposed between the second conductive layer and the extended second portion of the third conductive layer, wherein the second insulating layer has a recessed portion at which a third portion of the second conductive layer is directly covered by the third insulating layer.

According to the embodiments of the invention, the extended portion of the third insulating layer is employed to construct the second storage capacitor overlying the first storage capacitor without occupying additional pixel area, thus, the storage capacitance is increased without affecting the aperture ratio. Specifically, the first portion and the extended portion of the third insulating layer are formed concurrently, thus, reducing the process complexity and cost.

DESCRIPTION OF THE DRAWINGS

The invention can be more fully understood by reading the subsequent detailed description in conjunction with the examples and references made to the accompanying drawings.

DETAILED DESCRIPTION

First Embodiment

Figure 2A:
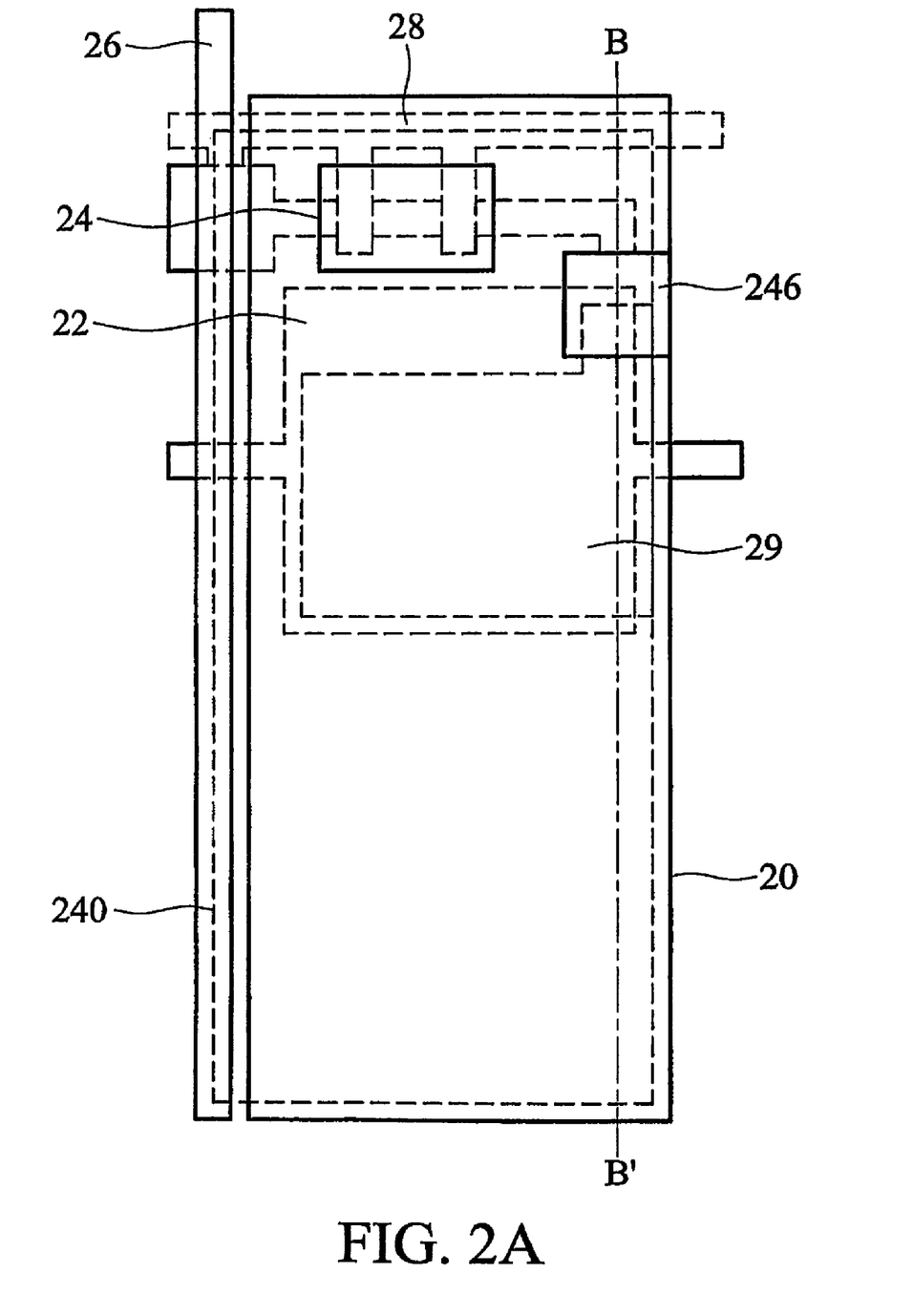
FIG. 2A is a plan view of a pixel where a stacked storage capacitor structure for a LTPS TFT-LCD of a first embodiment of the invention is formed.

FIG. 2A is a plan view of a pixel where a stacked storage capacitor structure for a TFT structure of an embodiment of the invention is formed. FIG. 2E is a sectional view taken along line B-B' of the pixel shown in FIG. 2A, and FIGS. 2B to 2E are sectional views of a method for fabricating the TFT structure. FIG. 2F is an equivalent circuit of the pixel shown in FIG. 2A.

In FIG. 2A, a pixel 20 with a stacked storage capacitor structure comprising a first storage capacitor (Cst) 22 and a second capacitor (Cst') 29, a TFT 24 and a pixel electrode 240 disposed thereon is provided. A signal line 26 and a gate line 28 intersect in the vicinity of the TFT 24, and are disposed around the pixel 20. The second storage capacitor (Cst') 29 is over the first capacitor (Cst) 22. The pixel electrode 240 and the stacked storage capacitor structure are electrically connected to the TFT 24 by means of via 246.

Figure 2B:
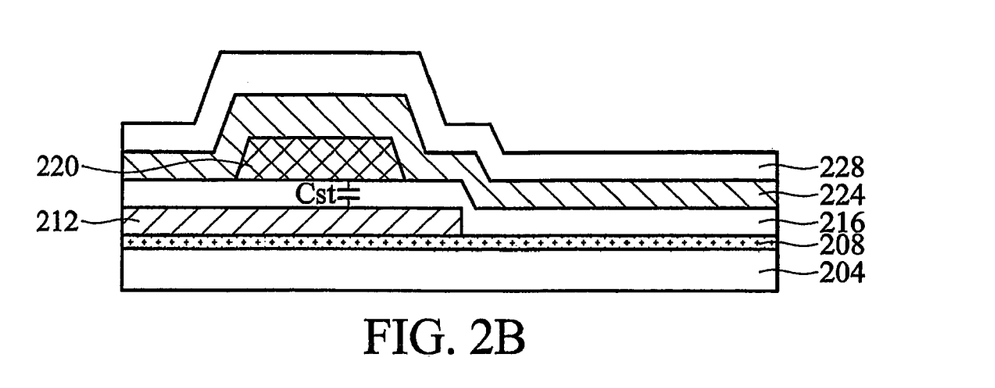

In FIG. 2B, there a substrate 204, a buffer layer 208, a p-Si layer 212 as a first conductive layer, a gate insulating layer 216, a second conductive layer 220, a first interlayer dielectric 224, and a second interlayer dielectric 228 are provided. The p-Si layer 212, the second conductive layer 220 and the gate insulating layer 216 therebetween consist of the first storage capacitor (Cst) 22.

Figure 2C:
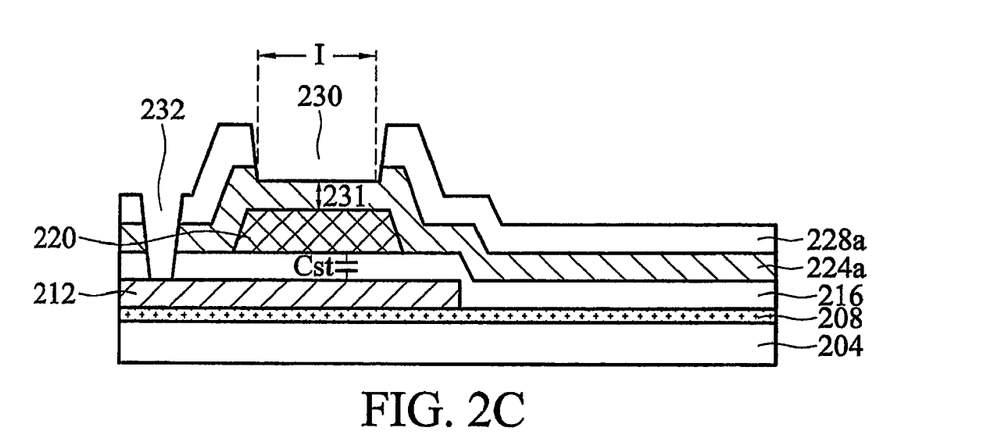

In FIG. 2C, openings 230 and 232 are formed by photolithography and etching in sequence. That is, a photoresist pattern (not shown) is formed on the second interlayer dielectric 228. A portion of the second interlayer dielectric 228 within the region I is fully etched and a portion of the first interlayer dielectric 224 within the region I is partially etched by wet etching or dry etching using the photoresist pattern as the etching mask, thus, the resultant second interlayer dielectric 228a and first interlayer dielectric 224a is formed. The first interlayer dielectric 224a and the second interlayer dielectric 228a have a thickness between 800 and 3000 Å, preferably 3000 Å, except that the preferred thickness 231 of the first interlayer dielectric 224a within the region I is 1000 Å. The first interlayer dielectric may comprise $SiN_x$ or $SiO_x$.

Figure 2D:
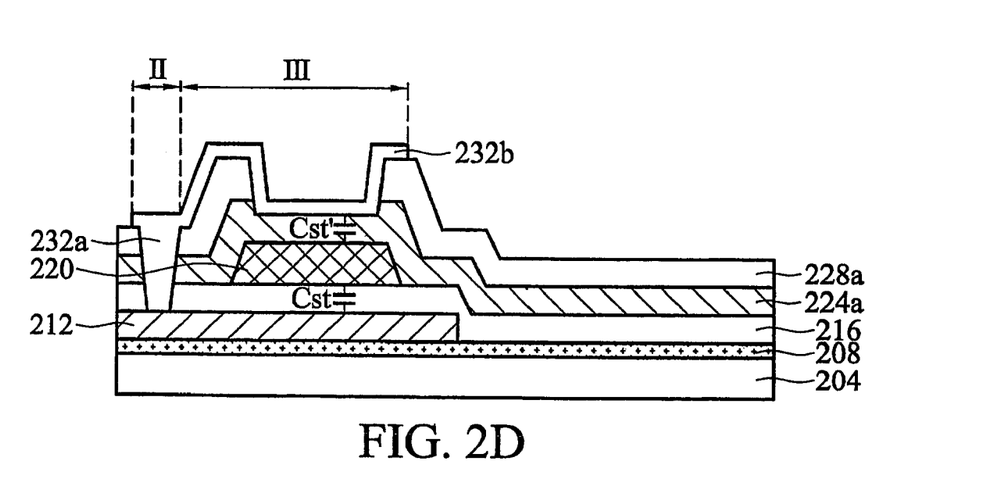
Figure 2E:
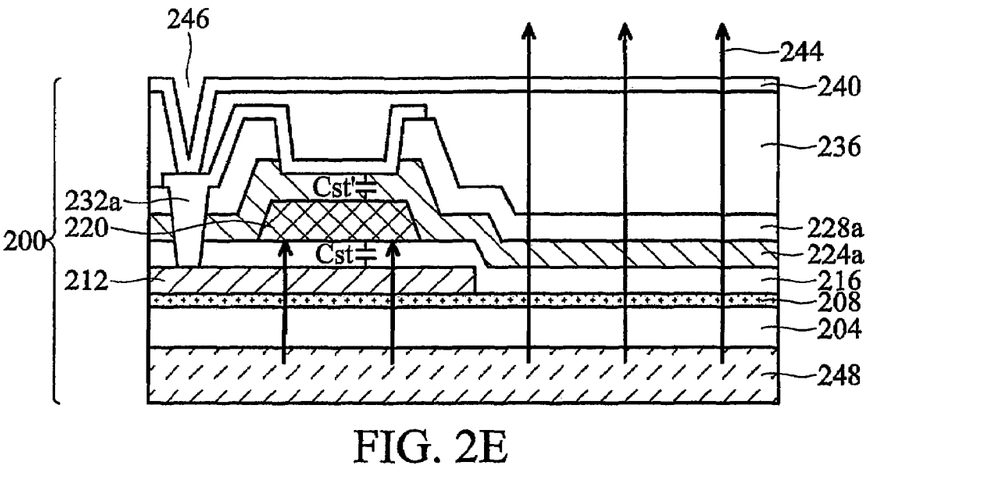
FIG. 2E is a sectional view taken along line B-B' of the pixel shown in FIG. 1A, and FIGS. 2B to 2E are sectional views of a method for fabricating the stacked storage capacitor structure.
Figure 2F:
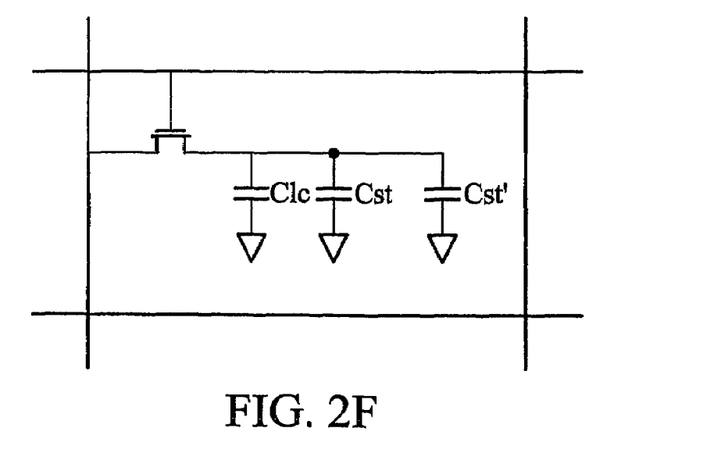
FIG. 2F is an equivalent circuit of the pixel shown in FIG. 2A.

In FIG. 2D, a third conductive layer, comprising a first portion 232a and an extended second portion 232b extending over a portion of the second interlayer dielectric 228a, is deposited by conventional CVD, ECP or PVD. The first portion 232a and the extended second portion 232b are confined within regions II and III, respectively. The opening 232 is filled with a metal material comprising Al or Cu. The third conductive layer, the second conductive layer 220 and the sandwiched first interlayer dielectric 224a consist of the second storage capacitor (Cst') 29.

In FIG. 2E, by means of well known processes, a passivation layer 236 with via 246 therein is formed over the third conductive layer and the second interlayer dielectric 228a. A transparent pixel electrode 240 is conformally formed on the passivation layer 236 and the via 246. The pixel electrode 240 may comprise ITO or IZO. In addition, a backlight module 248 is disposed on the other side of the substrate 204, thus, a TFT array substrate 200 for a LTPS TFT-LCD is obtained. The arrow 244 represents light from the backlight module 248.

In FIG. 2F, as a result of the described method, a stacked storage capacitor structure comprising the first capacitor storage (Cst) 22 and the second capacitor storage (Cst') 29 has additional capacitance i.e. capacitance of the second capacitor (Cst') 29 compared to the related art.

Figure 2G:
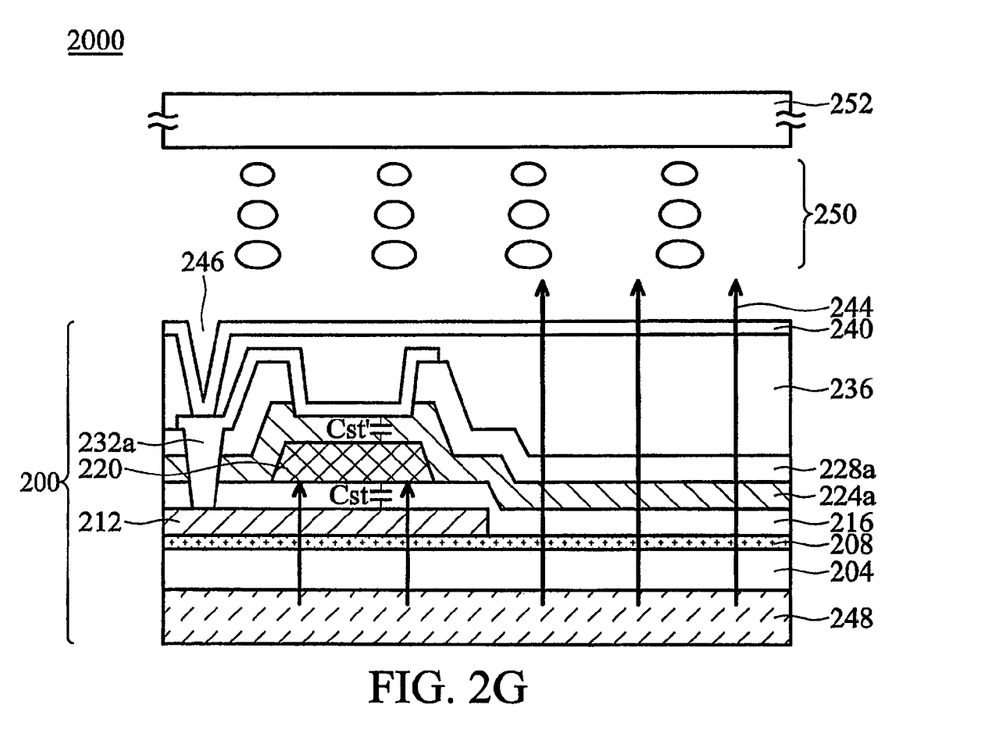
FIG. 2G is a sectional view of an LTPS TFT-LCD panel.

In FIG. 2G, an LTPS TFT-LCD panel 2000 is obtained by means of attachment of the TFT array substrate 200 to a color filter substrate 252 and formation of a liquid crystal layer 250 therebetween.

Second Embodiment

Figure 3A:
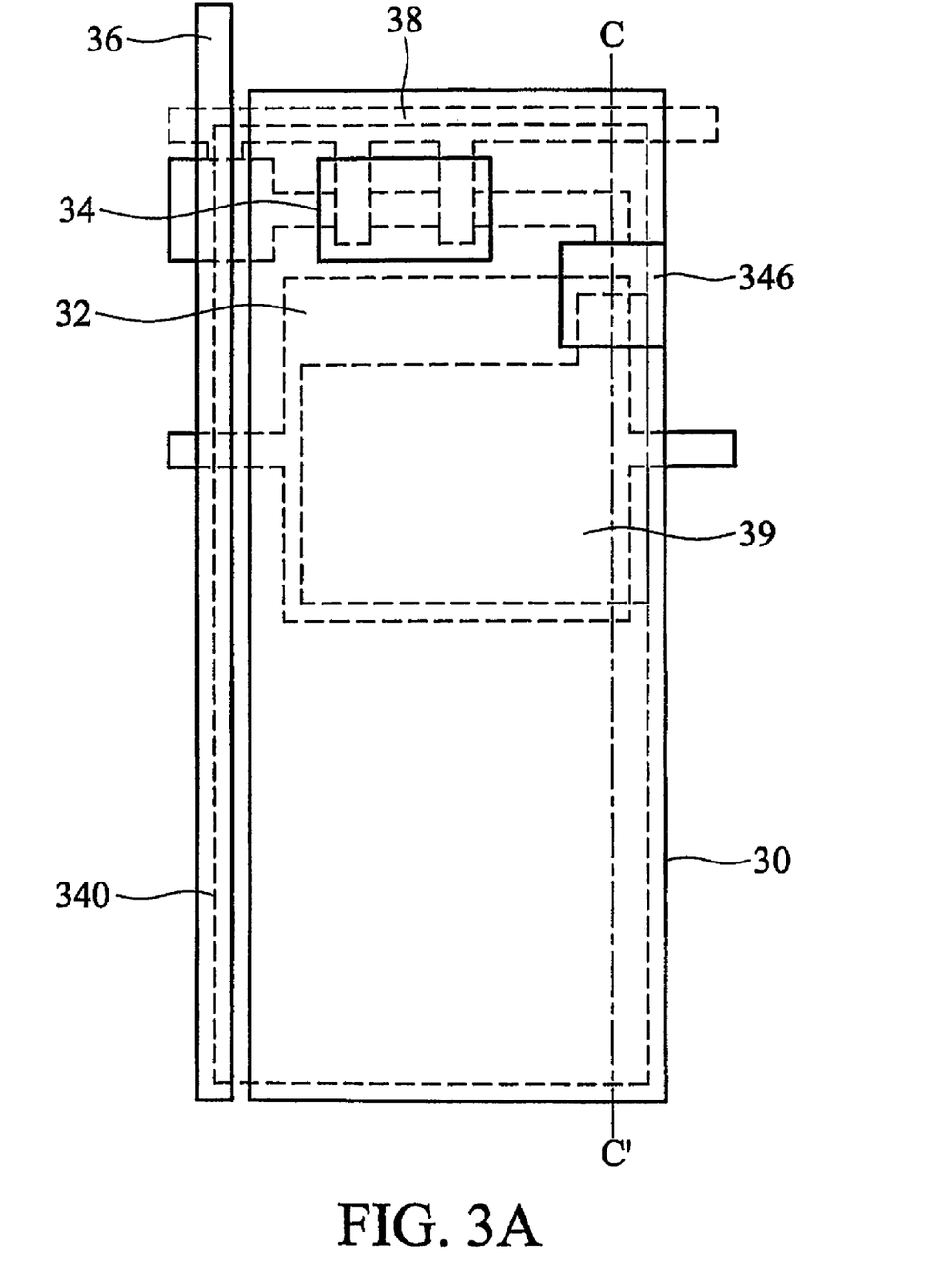
FIG. 3A is a plan view of a pixel where a stacked storage capacitor structure for a LTPS TFT-LCD of a second embodiment of the invention is formed.

FIG. 3A is a plan view of a pixel where a stacked storage capacitor structure for a LTPS TFT-LCD of a second embodiment of the invention is formed. FIG. 3G is a sectional view taken along line C-C' of the pixel shown in FIG. 3A, and FIGS. 3B to 3G are sectional views of a method for fabricating the stacked storage capacitor structure.

In FIG. 3A, a pixel 30 with a stacked storage capacitor structure comprising a first storage capacitor (Cst) 32 and a second storage capacitor (Cst') 39, a TFT 34 and a pixel electrode 340 disposed thereon is provided. A signal line 36 and a gate line 38 intersect in the vicinity of the TFT 34, and are disposed around the pixel 30. The second storage capacitor (Cst') 39 is over the first storage capacitor (Cst) 32. The pixel electrode 340 and the stacked storage capacitor structure are electrically connected to the TFT 34 by means of via 346.

Figure 3B:
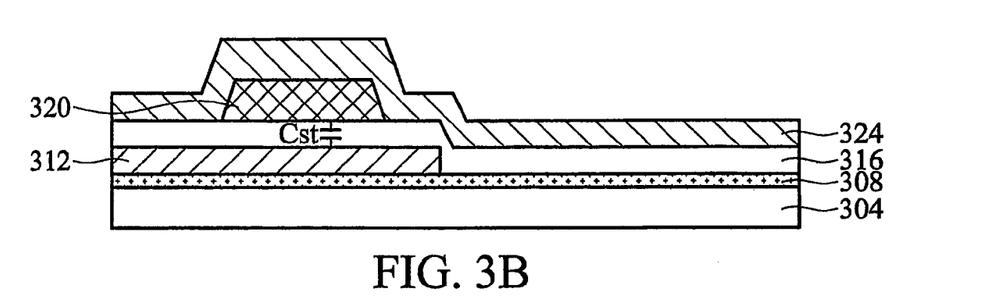

In FIG. 3B, there a substrate 304, a buffer layer 308, a p-Si layer 312 as a first conductive layer, a gate insulating layer 316, a second conductive layer 320, and a first interlayer dielectric 324 is provided. The p-Si layer 312, the second conductive layer 320 and the gate insulating layer 316 therebetween consist of the first storage capacitor (Cst) 32.

Figure 3C:
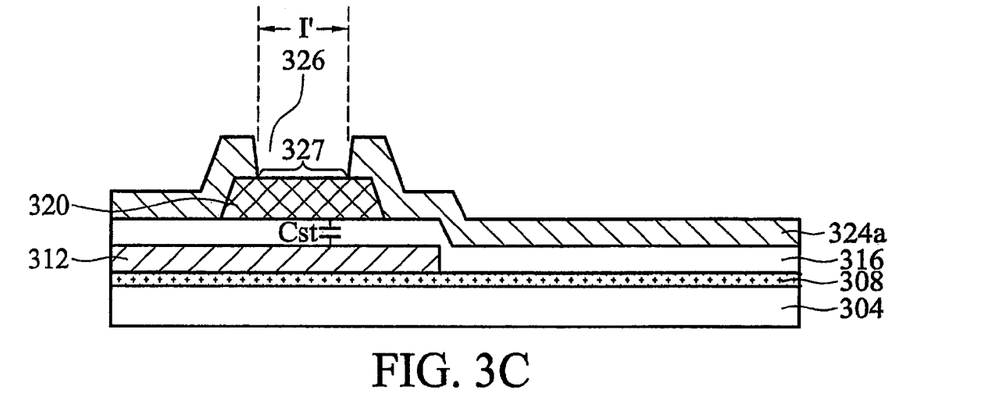

In FIG. 3C, an opening 326 is formed by photolithography and etching in sequence. That is, a photoresist pattern (not shown) is formed on the first interlayer dielectric 324 which is etched by wet etching or dry etching using the photoresist pattern as the etching mask, thus, the resultant first interlayer dielectric 324a is formed. Specifically, a portion of the first interlayer dielectric 324 within the region I' is fully removed so that a portion surface 327 of the second conductive layer 320 is exposed.

Figure 3D:
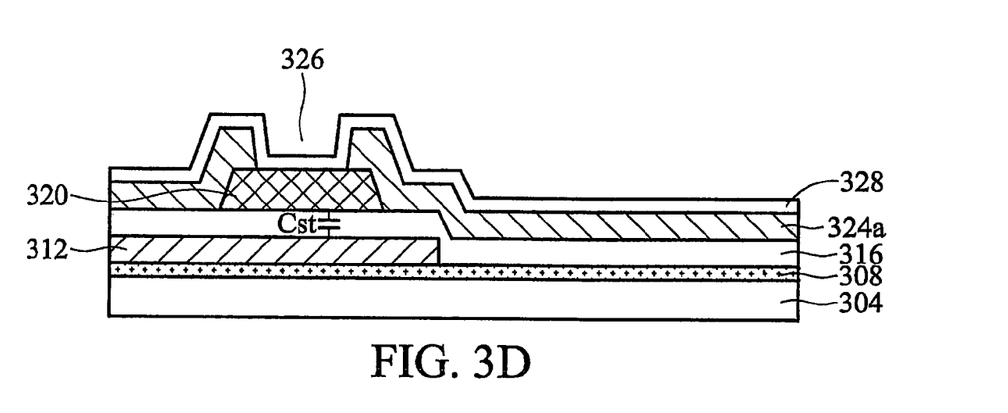

In FIG. 3D, a second interlayer dielectric 328 is conformally disposed over the first interlayer dielectric 324a and the exposed surface 327 of the second conductive layer 320. Formation of the second interlayer dielectric 328 comprises CVD or PECVD. The second interlayer dielectric 328, comprising $SiN_x$ or $SiO_x$, has a thickness between 400 and 1200 Å, preferably between 600 and 700 Å.

Figure 3E:
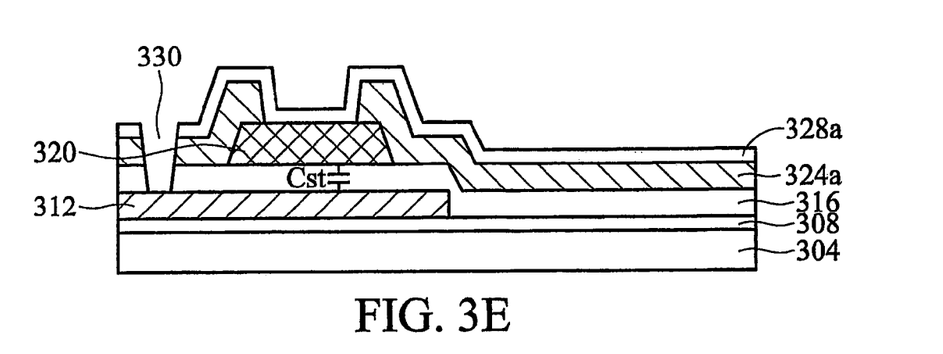

In FIG. 3E, an opening 330 is formed by wet or dry etching through the second interlayer dielectric 328, the first interlayer dielectric 324a and the gate insulating layer 316 until a portion surface of the p-Si layer 312 is exposed while the second interlayer dielectric 328a, the first interlayer dielectric 324a and the gate insulating layer 316a remain.

Figure 3F:
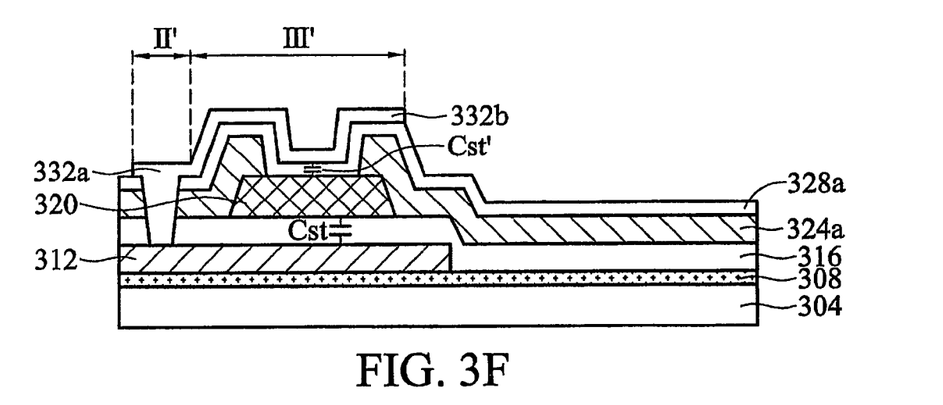
Figure 3G:
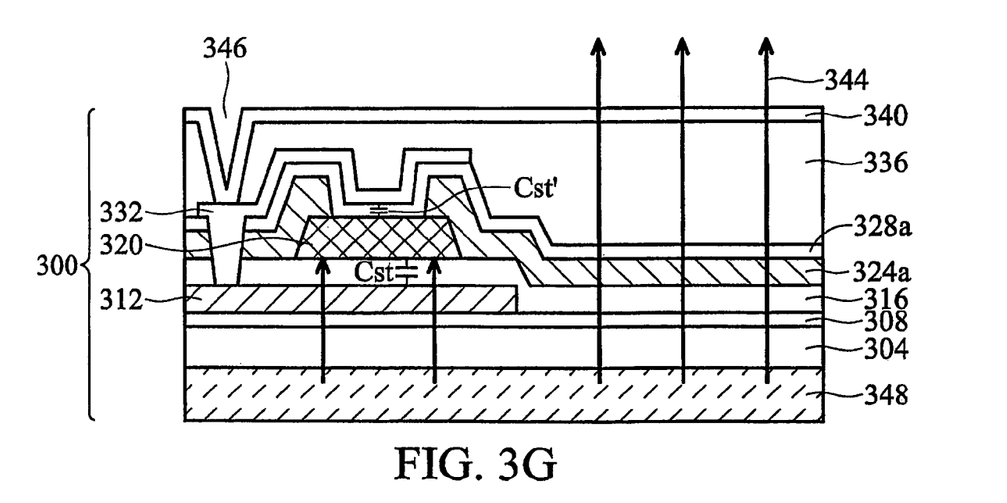
FIG. 3G is a sectional view taken along line C-C' of the pixel shown in FIG. 3A, and FIGS. 3B to 3G are sectional views of a method for fabricating the stacked storage capacitor structure.

In FIG. 3F, a third conductive layer, comprising a first portion 332a and an extended second portion 332b extending over a portion of the second interlayer dielectric 328a, is deposited by conventional CVD, ECP or PVD. The first portion 332a and the extended second portion 332b are confined within regions II and III, respectively. The opening 330 is filled with a metal material comprising Al or Cu. The third conductive layer, the second conductive layer and the sandwiched second interlayer dielectric 328a consist of the second storage capacitor (Cst') 39.

In FIG. 3G, by means of well known processes, a passivation layer 336 with via 346 therein is formed over the third conductive layer and the second interlayer dielectric 328a. A transparent pixel electrode 340 is conformally formed on the passivation layer 336 and the via 346. The pixel electrode 340 may comprise ITO or IZO. In addition, a backlight module 348 is disposed on the other side of the substrate 304, thus, a TFT array substrate 300 for a LTPS TFT-LCD is obtained. The arrow 344 represents light from the backlight module 348.

Similar to FIG. 2F, as a result of the described method, a stacked storage capacitor structure comprising the first storage capacitor (Cst) 32 and the second storage capacitor (Cst') 39 having additional storage capacitance i.e. capacitance of the second storage capacitor (Cst') 39 compared to the related art is formed.

Figure 3H:
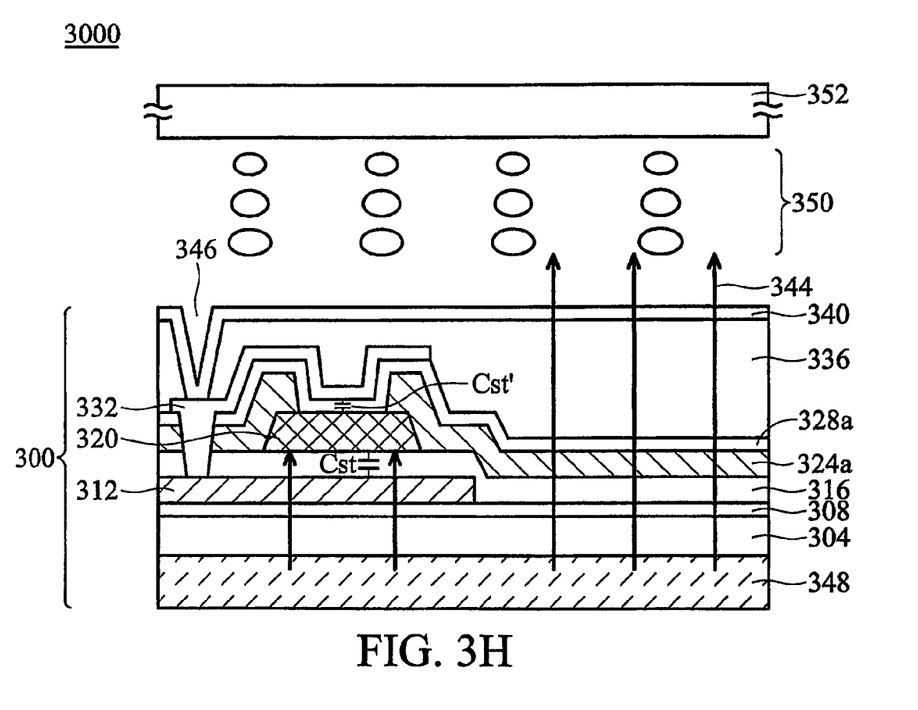
FIG. 3H is a sectional view of an LTPS TFT-LCD panel.

In FIG. 3H, an LTPS TFT-LCD panel 3000 is obtained by means of attachment of the TFT array substrate 300 to a color filter substrate 352 and formation of a liquid crystal layer 350 therebetween.

Figure 4:
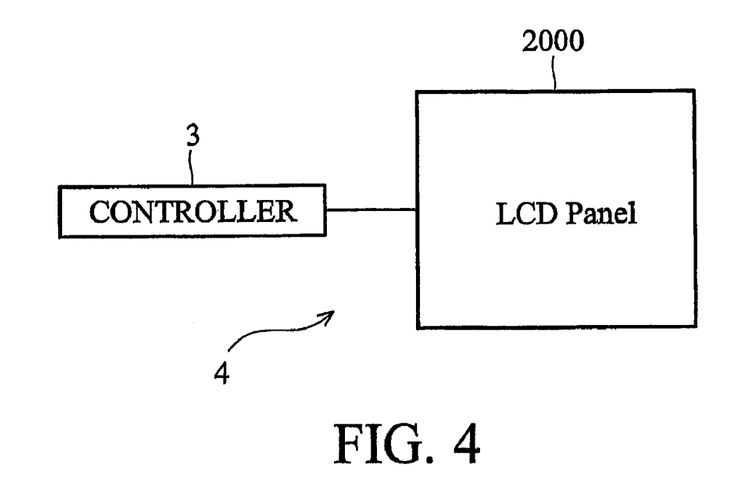
FIG. 4 is a schematic diagram of an LTPS TFT-LCD device in accordance with the present invention.

FIG. 4 is a schematic diagram illustrating an LTPS LCD device incorporating the LTPS TFT-LCD panel 2000 of FIG. 2G according to the present invention. The LTPS TFT-LCD panel 2000 as shown in FIG. 2G is coupled to a controller 3 to form a LTPS TFT-LCD device 4. The controller 3 can comprise a source and gate driving circuits (not shown) to control the LTPS TFT-LCD panel 2000 in accordance with input. In another embodiment, the LTPS TFT-LCD panel 2000 in FIG. 4 can be replaced with the LTPS TFT-LCD panel 3000.

Figure 5:
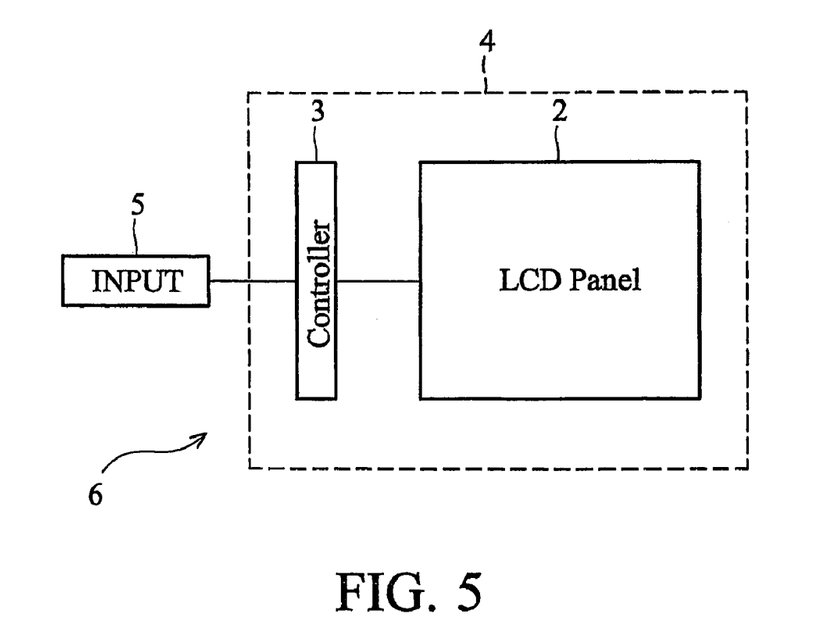
FIG. 5 is a schematic diagram of an electronic device incorporating the LTPS TFT-LCD device shown in FIG. 4.

FIG. 5 is a schematic diagram illustrating an electronic device incorporating the LTPS TFT-LCD device 4 shown in FIG. 4. An input device 5 is coupled to the controller 3 of the LTPS TFT-LCD device 4 shown in FIG. 4 to form an electronic device 6. The input device 5 can include a processor or the like to input data to the controller 3 to render an image. The electronic device 6 may be a portable device such as a PDA, notebook computer, tablet computer, cellular phone, or a display monitor device, or non-portable device such as a desktop computer.

According to the described embodiments of the invention, the extended portion of the third insulating layer is employed to construct the second storage capacitor overlying the first storage capacitor without occupying additional pixel area, thus, the storage capacitance is increased without affecting the aperture ratio. Specifically, the first portion and the extended portion of the third insulating layer are formed concurrently, thus, reducing the process complexity and cost.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A stacked storage capacitor structure for a LTPS TFT-LCD, comprising:
    a substrate;
    a first storage capacitor comprising a first conductive layer, a second conductive layer and a first insulating layer therebetween, wherein the second conductive layer is disposed over the first conductive layer, and wherein the first storage capacitor is disposed over the substrate;
    a third conductive layer comprising a first portion and an extended second portion; and
    a second storage capacitor comprising the second conductive layer, the extended second portion of the third conductive layer and a second insulating layer therebetween, wherein the extended second portion of the third conductive layer is disposed over the second conductive layer, and wherein the second storage capacitor is over the first storage capacitor, and is electrically connected thereto; and
    a third insulating layer between the second conductive layer and the extended second portion of the third conductive layer,
    wherein the first portion of the third conductive layer is electrically connected to the first conductive layer through the third insulating layer, the second insulating layer and the first insulating layer.

2. The stacked storage capacitor structure for a LTPS TFT-LCD according to claim 1, further comprising a passivation layer with a via hole therein and a pixel electrode overlying the passivation layer, wherein the pixel electrode is electrically connected to the first portion of the third conductive layer through the via hole.

3. The stacked storage capacitor structure for a LTPS TFT-LCD according to claim 2, wherein the third insulating layer and the second insulating layer has a recessed portion.

4. The stacked storage capacitor structure for a LTPS TFT-LCD according to claim 1, wherein the third insulating layer comprises silicon oxide.

5. A LTPS TFT-LCD panel, comprising:
    a stacked storage capacitor structure for a LTPS TFT-LCD as claimed in claim 1;
    a color filter substrate opposite a TFT array substrate; and
    a liquid crystal layer between the TFT array substrate and the color filter substrate.

6. A LTPS TFT-LCD device, comprising:
    the LTPS TFT-LCD panel as claimed in claim 5; and
    a controller coupled to the LTPS TFT-LCD panel, controlling the panel to render images in accordance with input.

7. An electronic device, comprising:
    the LTPS TFT-LCD device as claimed in claim 6;
    an input device coupled to the controller of the LTPS TFT-LCD device, controlling the display device to render images.

8. The stacked storage capacitor structure for a LTPS TFT-LCD according to claim 1, wherein the substrate comprises a buffer layer.

9. The stacked storage capacitor structure for a LTPS TFT-LCD according to claim 1, the second insulating layer comprises silicon nitride.

10. A stacked storage capacitor structure for a LTPS TFT-LCD, comprising:
    a substrate;
    a first storage capacitor comprising a first conductive layer, a second conductive layer and a first insulating layer therebetween, wherein the second conductive layer is disposed over the first conductive layer, and wherein the first storage capacitor is disposed over the substrate;
    a third conductive layer comprising a first portion and an extended second portion; and
    a second storage capacitor comprising the second conductive layer, the extended second portion of the third conductive layer and a second insulating layer therebetween, wherein the extended second portion of the third conductive layer is disposed over the second conductive layer, and wherein the second storage capacitor is over the first storage capacitor, and is electrically connected thereto,
    wherein a third portion of the third conductive layer is directly in contact with a fourth portion of the second insulating layer, wherein the fourth portion of the second insulating layer has a relative thickness less than that of the other portion of the second insulating layer.

11. The stacked storage capacitor structure for a LTPS TFT-LCD according to claim 10, the fourth portion of the second insulating layer has a thickness between 800 and 1200 Å.

12. The stacked storage capacitor structure for a LTPS TFT-LCD according to claim 11, wherein the substrate comprises a substrate and a buffer layer.

13. The stacked storage capacitor structure for a LTPS TFT-LCD according to claim 12, wherein the first portion of the third conductive layer is electrically connected to the first conductive layer through the third insulating layer, the second insulating layer and the first insulating layer.

14. The stacked storage capacitor structure for a LTPS TFT-LCD according to claim 13, the second insulating layer comprises silicon nitride.

15. The stacked storage capacitor structure for a LTPS TFT-LCD according to claim 2, wherein the second insulating layer has a recessed portion at which a third portion of the second conductive layer is directly covered by the third insulating layer.

16. The stacked storage capacitor structure for a LTPS TFT-LCD according to claim 15, wherein the third insulating layer has a thickness between 400 and 1000 Å.

17. The stacked storage capacitor structure for a LTPS TFT-LCD according to claim 16, wherein the substrate comprises a buffer layer thereon.

18. The stacked storage capacitor structure for a LTPS TFT-LCD according to claim 10, further comprising a passivation layer with a via hole therein and a pixel electrode overlying the passivation layer, wherein the pixel electrode is electrically connected to the first portion of the third conductive layer through the via hole.

19. The stacked storage capacitor structure for a LTPS TFT-LCD according to claim 18, further comprising a third insulating layer between the second insulating layer and the extended second portion of the third conductive layer, wherein the third insulating layer and the second insulating layer has a recessed portion.

20. The stacked storage capacitor structure for a LTPS TFT-LCD according to claim 10, wherein the third insulating layer comprises silicon oxide.

* * * * *